Geo Wanier's Plumbers Painters Lamp.
*assigned to Self & Franz Wanier*
No. 71826
PATENTED DEC 3 1867
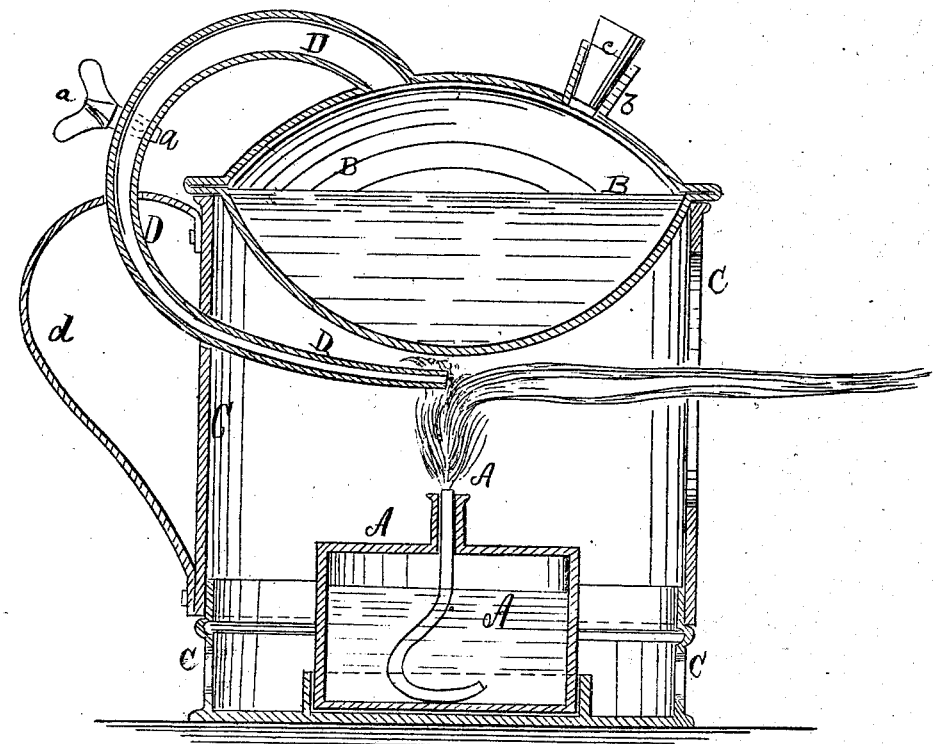
Witnesses:
Inventor:

ated:true # United States Patent Office.

GEORGE WANIER, OF NEW YORK, N. Y., ASSIGNOR TO HIMSELF AND FRANZ WANIER, OF THE SAME PLACE.

Letters Patent No. 71,826, dated December 3, 1867.

IMPROVEMENT IN PLUMBERS' AND PAINTERS' LAMP.

The Schedule referred to in these Letters Patent and making part of the same.

TO ALL WHOM IT MAY CONCERN:

Be it known that I, GEORGE WANIER, of the city, county, and State of New York, have invented a new and improved Plumbers' and Painters' Lamp; and I do hereby declare that the following is a full, clear, and exact description thereof, which will enable others skilled in the art to make and use the same, reference being had to the accompanying drawing, forming part of this specification. The drawing represents a sectional elevation of my improved lamp.

This invention relates to a new lamp for creating a powerful flame, similar to that produced by means of the ordinary blow-pipe. Its object is to have a self-acting blow-pipe, and to produce a flame which can be used by painters for burning old paint on doors, &c., prior to applying the fresh paint.

The invention consists in the use of a boiler containing alcohol, arranged above the flame of an alcohol-lamp and provided with a curved tube leading into the flame of the lamp. The heat of the lamp will vaporize the alcohol in the boiler, and the vapor of alcohol will be blown with great power through the flame of the lamp, and will itself be ignited, thereby making a very long and powerful flame.

A represents a lamp, of suitable construction, fed with alcohol or other suitable burning-fluid. B is a vessel of suitable shape, made of sheet metal. In the drawing it is represented lens-shaped, which I prefer. The vessel B is supported by a stand, C, of any suitable construction, and so as to be held above the lamp, as shown. A curved tapering or other tube or pipe, D, extends from the vessel B to the flame of the lamp. This tube may, if desired, be provided with a stop-cock, $a$, as shown by red lines in the drawing. The vessel B is filled with alcohol or other suitable liquid, being provided with an opening, $b$, for the purpose; said opening being then closed by a suitable stopper or valve, $c$. The wick of the lamp A being ignited, the alcohol in the vessel B is heated and is vaporized; the vapor escaping with considerable force through the tube D, thus being blown into the flame, thereby extending the same and concentrating it into one point. The vapor itself will also be ignited, and will thereby serve to make the flame still more powerful. The case or stand C, when made so as to hold the lamp and the vessel B at the same time, and when provided with a handle, $d$, will be very convenient, especially for painters, as thereby the flame can be directed and handled at will. The stop-cock $a$ serves to at once cut off the supply of vapor, thereby giving still more control over the flame.

I claim as new, and desire to secure by Letters Patent—

1. The lamp-vessel B provided with a pipe, D, in combination with a lamp, A, and case, C, all arranged and operating substantially as and for the purpose specified.

2. I claim the lower stand C in which the lamp A is placed, in combination with the upper stand C and vessel B, constructed and arranged substantially as and for the purpose specified.

3. An automatic blow-pipe, made to blow alcohol or other steam through the flame of a lamp, the steam being created by the same flame through which it is forced, substantially as herein shown and described.

GEORGE WANIER.

Witnesses:
   WM. F. MCNAMARA,
   A. V. BRIESEN.